US010981514B2

United States Patent
Mcloughlin et al.

(10) Patent No.: US 10,981,514 B2
(45) Date of Patent: Apr. 20, 2021

(54) SYSTEM FOR SECURING EQUIPMENT IN AN EMERGENCY VEHICLE

(71) Applicants: John E. Mcloughlin, Hauppauge, NY (US); Phung Le, Lake Grove, NY (US)

(72) Inventors: John E. Mcloughlin, Hauppauge, NY (US); Phung Le, Lake Grove, NY (US)

( * ) Notice: Subject to any disclaimer, the term of this patent is extended or adjusted under 35 U.S.C. 154(b) by 0 days.

(21) Appl. No.: 17/061,227

(22) Filed: Oct. 1, 2020

(65) Prior Publication Data
US 2021/0016716 A1    Jan. 21, 2021

Related U.S. Application Data

(63) Continuation-in-part of application No. 16/449,872, filed on Jun. 24, 2019, now Pat. No. 10,850,674.

(51) Int. Cl.
*B60R 7/04*  (2006.01)
*B60R 7/08*  (2006.01)

(52) U.S. Cl.
CPC .  *B60R 7/04* (2013.01); *B60R 7/08* (2013.01)

(58) Field of Classification Search
CPC ................................... B60R 7/04; B60R 7/08

USPC ............................................................ 224/311
See application file for complete search history.

(56) References Cited

U.S. PATENT DOCUMENTS

| | | | | |
|---|---|---|---|---|
| 5,116,010 A | * | 5/1992 | McMasters | B60R 7/14 224/311 |
| 5,372,289 A | * | 12/1994 | Dachicourt | B60R 7/02 224/281 |
| 5,653,318 A | * | 8/1997 | Field | 190/111 |

* cited by examiner

*Primary Examiner* — Peter N Helvey
(74) *Attorney, Agent, or Firm* — Louise S. Heim

(57) ABSTRACT

A storage assembly includes an attachment system for securing an item to a surface. The attachment system includes a first mounting component fixed to the surface and a second mounting component fixed to the item and cooperating with the first component to detachably secure the item to the surface. A retention assembly associated with the first and second mounting components prevents accidental separation of the two components. The attachment system may also include a manipulation element coupled to one of the first and second retention elements and configured to facilitate intentional separation of the two mounting elements.

18 Claims, 7 Drawing Sheets

SYSTEM FOR SECURING EQUIPMENT IN AN EMERGENCY VEHICLE

CROSS-REFERENCE TO RELATED APPLICATIONS

This application is a continuation-in-part of U.S. patent application Ser. No. 16/449,872, filed Jun. 24, 2019, the contents of which are herein incorporated by reference.

TECHNICAL FIELD

The present disclosure relates in general to storage and mounting systems. More particularly, the disclosure relates to a system for storing items in an emergency vehicle. In a further and more specific aspect, the disclosure concerns a storage assembly including an airtight protective bag for storing firefighting equipment, and an attachment system for securing the bag to a surface in the cabin of a firefighting vehicle.

BACKGROUND

Firefighters must wear protective helmets to prevent head injuries due to falling debris at the scene of a fire or other emergency. Until recently, it was common for these individuals to wear their helmets in their fire trucks while being transported to or from the scene. However, helmets have been found to interfere with the occupant restraint systems on firetrucks and to increase the risk of head or neck injury during a crash. This led the National Fire Protective Association (NFPA) to state that occupants of a firefighting vehicle should not wear their helmets while the vehicle is in motion, and to revise their standard for Automotive Fire Apparatus (NFPA 1901) to require proper helmet storage during vehicle movement.

In addition to helmets, firefighters are issued a wide variety of other protective devices and garments such as gloves, boots, respirators, hoods, and gas masks, all of which frequently come into with toxic and carcinogenic contaminants such as polynuclear aromatic hydrocarbons (PAHs), diesel exhaust particles, hydrogen cyanide, mold, arsenic, phthalate plasticizers, and polybromiated diphenyl ether flame retardants (PBDEs). Some of these contaminants can be absorbed through a firefighter's skin, while others may be off-gassed and inhaled by the firefighters when they remove their respiratory protection. As a result, the NFPA Standard on Selection, Care, and Maintenance of Protective Ensembles for Structural Firefighting and Proximity Firefighting (NFPA 1851) has recently been revised to prohibit soiled or contaminated clothing from being transported in the cab of a firefighting vehicle unless placed in an airtight protective case or bag to prevent cross-contamination.

Accordingly, there exists a need for an airtight bag for storing a firefighter's personal protective including helmets and other gear such as gloves, boots, respirators, hoods, and gas masks in the cab of a firefighting vehicle. The bag must include a plurality of distinct compartments to prevent cross-contamination among items. Furthermore, the bag must be secured within the cab in such a way that it does not become a projectile when the vehicle stops, turns, or starts suddenly, and does not obstruct the movement of firefighters trying to quickly enter or exit the vehicle.

SUMMARY

A storage assembly according to the present disclosure includes an attachment system for securing an item to a surface. The attachment system includes a first mounting component fixed to the surface and a second mounting component fixed to the item and cooperating with the first component to detachably secure the item to the surface. A retention assembly associated with the first and second mounting components prevents accidental separation of the two components.

In one example, the first mounting component includes a pair of spaced-apart mounting rails fixed to the surface, and the second mounting component includes a rigid mounting plate secured to the item. The mounting plate is I-shaped and includes two enlarged portions and a connector portion extending between the two enlarged end portions. Each of the rails includes an upper portion and a lower portion, with a groove defined between the upper and lower portions. The upper portion of each rail includes a gap having a length equal to the length of one of the enlarged end portions. The retention assembly includes a pair of detent pins, each of which abuts against an edge of one of the enlarged portions of the mounting plate. Each detent pin serves as a first retention element, and the abutting edge of one of the enlarged portions of the mounting plate serves as a second retention element which cooperates with the first retention element to prevent the mounting plate from sliding out of the rails.

In another example, the first mounting component includes a mounting bracket defining an opening, and the second mounting component includes a compressible rod having a stationary segment and a movable segment. The opening in the mounting bracket serves as a first retention element, and one end of the movable segment of the compressible rod serves as a second retention element which cooperates with the first retention element to prevent accidental separation of the rod from the mounting bracket.

In each of the above examples, the attachment system may include a manipulation element coupled to one of the retention elements and configured to facilitate intentional separation of the two mounting components. In the first example, the manipulation element may include an enlarged ring at the end of each detent pin, which it makes it easy for a user to quickly grasp the pin and pull it out of the associated hole in one of the mounting rails. In the second example, the manipulation element may include a handle extending from the movable segment of the compressible rod.

In one aspect of the disclosure, the first mounting component of the attachment assembly is secured to a surface in the cab of an emergency vehicle such as a fire truck.

In another aspect of the disclosure, the second mounting component of the attachment assembly is secured to the bottom of a firefighter's gear bag. The bag defines at least one compartment sized and shaped to contain a personal safety item. In one embodiment, the bag defines a plurality of separate compartments, each sized and shaped to contain a personal safety item and configured to prevent cross-contamination between items. In one example, one of the compartments is sized and shaped to contain a firefighting helmet. In this example, the bag is free of any openings or pores that could admit fine particles, and includes a closure assembly configured to prevent particles or other debris from entering or exiting the helmet compartment or any of the pockets. The closure assembly may comprise zippers, the bag may also include a pocket containing a plurality of disposable and sealable liner bags for encasing individual items before storing the items in the bag.

DETAILED DESCRIPTION

Figure 1:
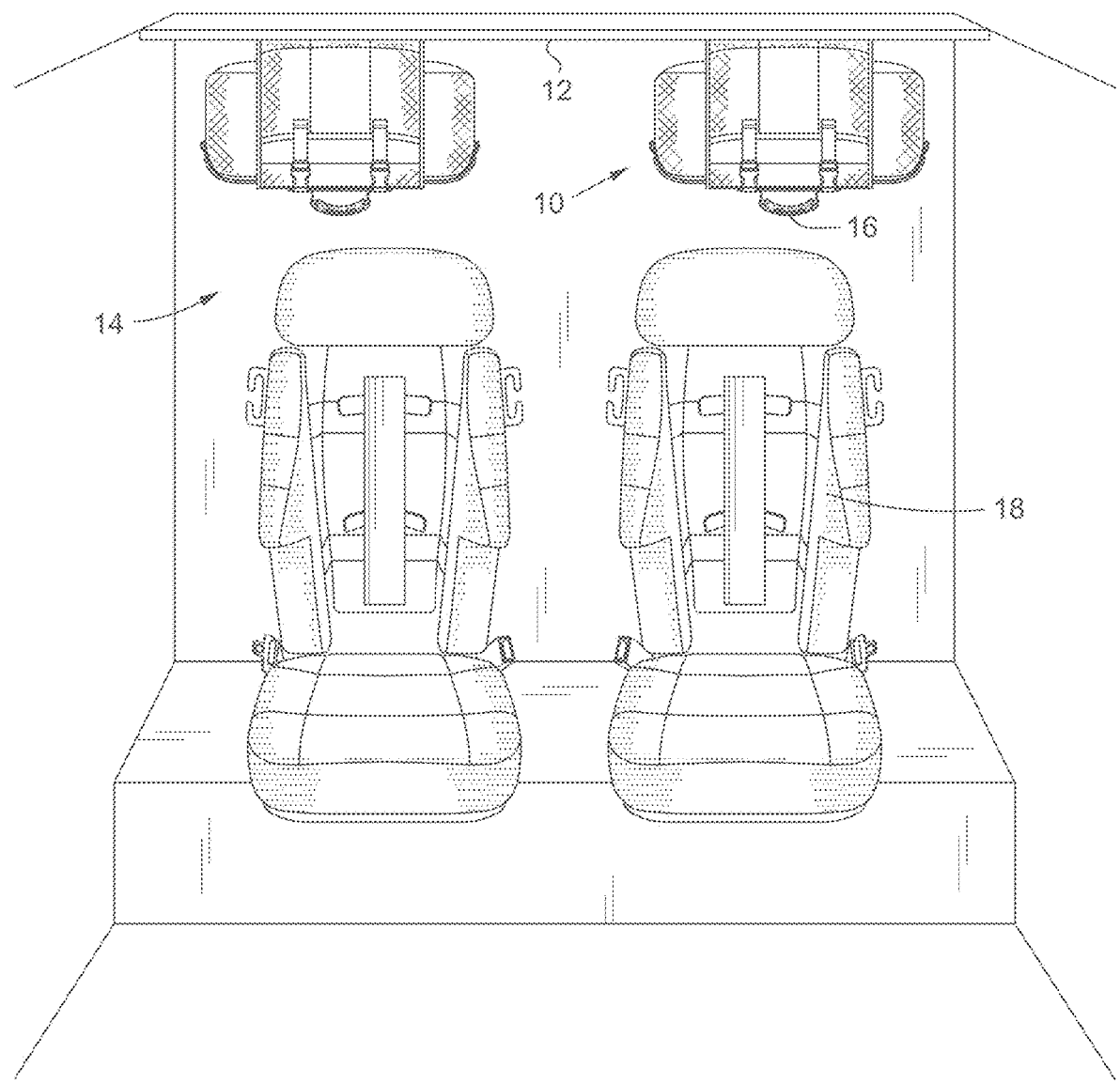
FIG. 1 is a perspective view showing a pair of gear bags mounted on the ceiling of a firefighting vehicle.

FIG. 1 is a perspective view showing a pair of gear bags 10 according to the present disclosure, mounted in a top-down position on the ceiling 12 of the passenger compartment 14 of an emergency vehicle such as a fire truck. Each of the gear bags 10 includes a handle 16 allowing a user to easily grab the bag and carry it, along with its contents, after removing it from the ceiling 12. Each gear bag 10 is shown here as being positioned directly above a passenger seat 18 in the vehicle, but the exact mounting location of the bags may vary depending on the size configuration and the vehicle. For instance, in larger vehicles, it may be desirable to mount the gear bags above an aisle between the seats. Alternatively, the bags could be mounted on the walls or floor of a vehicle.

Figure 2:
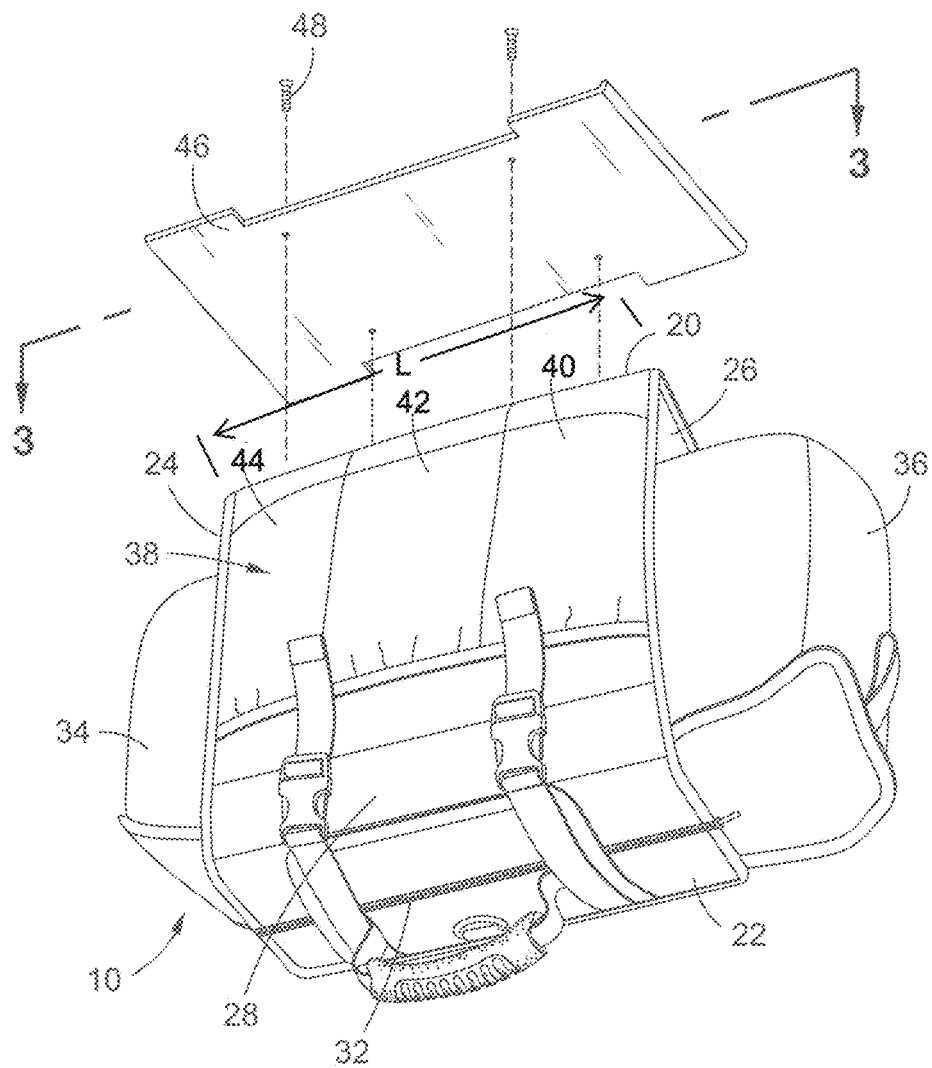
FIG. 2 is a perspective view showing one of the gear bags of FIG. 1 in exploded relationship to a mounting plate.
Figure 3:
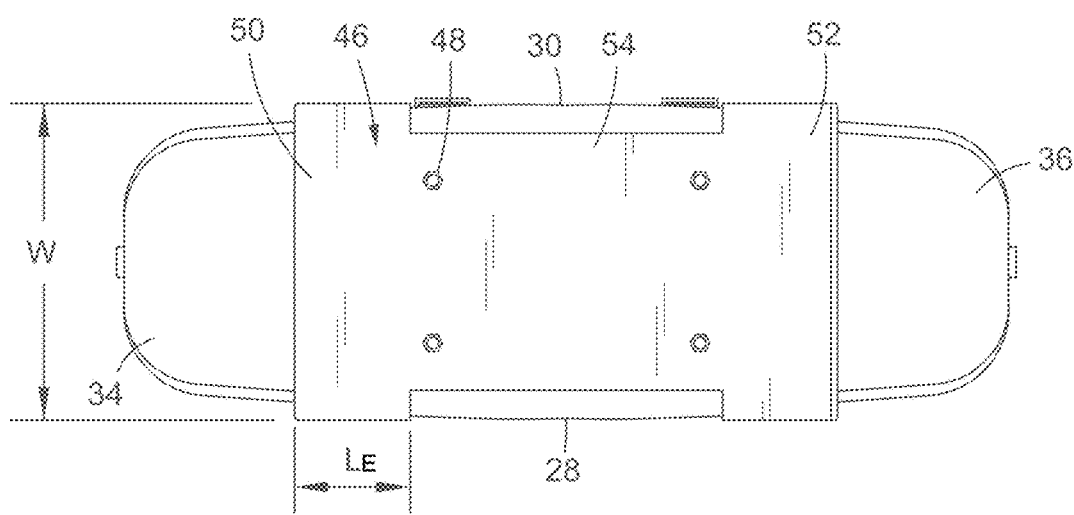
FIG. 3 is a plane view of the underside of the gear bag of FIG. 2, assembled with the mounting plate.

As best seen in FIGS. 2 and 3, each bag 10 includes a bottom wall 20, a top wall 22, a pair of end walls 24, 26, a front wall 28, and a rear wall 30. The top wall 22 includes a zippered opening 32 that provides access to a compartment sized and shaped to contain a firefighting helmet. For instance, the length of the helmet compartment, which is equal to the length L of the bottom wall, 20 may be approximately 12-17 inches in length. The width of the helmet compartment, which is equal to the length of the end walls, 24, 26, may be approximately 9-15 inches, and the depth of the helmet compartment, which is equal to the height of the front and rear walls 28, 30, may be approximately 5-12 inches in depth. Each end wall 24, 26 supports a zippered end pocket 34, 36 sized and shaped to contain an additional piece of firefighting gear. For instance, one end pocket may be sized and shaped to contain a safety hood, and the other end pocket may be sized and shaped to contain a face mask. Alternatively, either or both end pockets may be sized and shaped to contain a firefighting glove, or a pair of firefighting gloves. In one embodiment, each end pocket 34, 36 may define a compartment having a length that is about one-fourth to one half the length of the helmet compartment, a width that is ¼" to ½" less than the width of the helmet compartment, and a depth that is 1" to 2" inches less than the depth of the helmet compartment.

The front wall 28 supports an elongated, zippered front pocket 38 that is also sized and shaped to contain at least one piece of firefighting gear, such as a safety hood, face mask, or gloves. In one embodiment, the length of the elongated front pocket 38 is approximately the same as the length of the helmet compartment, and the height of the elongated front pocket 38 is about one-half to about three-fourths of the depth of the helmet compartment. The elongated front pocket 38 may optionally be divided into three smaller pockets 40, 42, 44, each of which is sized and shaped to contain a single item such as a firefighting glove, a safety hood, or a face mask. One of the pockets 40, 42, 44 may contain a packet of tissues enabling a firefighter to wipe potentially toxic or carcinogenic substances off the gear before storing it.

All the walls 20, 22, 24, 26, 38, 30 and all the pockets 34, 36, 38 of the gear bag 10 are made of a sturdy, water-resistant, and easily cleanable material such as vinyl. The material should have no mesh portions, and no small openings or pores that could allow fine particles to enter the bag. Furthermore, a closure assembly should be provided for preventing debris or particles from entering the pockets 34, 36, 38 or the helmet compartment. In a preferred embodiment, the closure assembly comprises a plurality of zippers, including a zipper for the helmet compartment, a zipper for each end compartment 34, 36, and at least one zipper for the elongated front pocket 38 (if the elongated front pocket is divided into smaller pockets, it may be desirable to provide a separate zipper for each small pocket 40, 42, 44). The closure assembly and the absence of small openings or pores in the gear bag 10 are critical, since firefighting environments are often filled with soot containing PCBs, formaldehyde, benzene, asbestos, and a variety of other carcinogenic materials. Since firefighters have been found to suffer from cancer at much higher rates than the general public, it is essential that they clean off their gear before placing it their gear bag, and that once in the bag, there is minimal potential for contaminants to enter the bag. Conversely, if contaminants should be bought into the bag with incompletely cleaned gear, there should be minimal potential for those contaminants to drop out of the bag, where they might then be deposited onto the floors of the firefighters' personal vehicles or even their homes.

In one embodiment, the gear bag 10 includes an additional pocket for storing a plurality of disposable and sealable liner bags. Thus, before placing any individual item in its compartment or pocket, the user may remove one of the liner bags, place the item in the liner bag, and seal the liner bag. This prevents the interior of the pockets or compartments from being contaminated themselves.

In one example, a mounting plate 46 made from a strong, rigid material such as steel or aluminum is secured by fasteners 48 such as bolts or rivets to the bottom wall 20 of the gear bag 10. As best seen in FIG. 3, the mounting plate 46 is I-shaped, with a pair of enlarged ends 50, 52 separated by a connector portion 54. Each enlarged end 50, 52 of the mounting plate 46 has a length $L_E$ and a width W.

Figure 4:
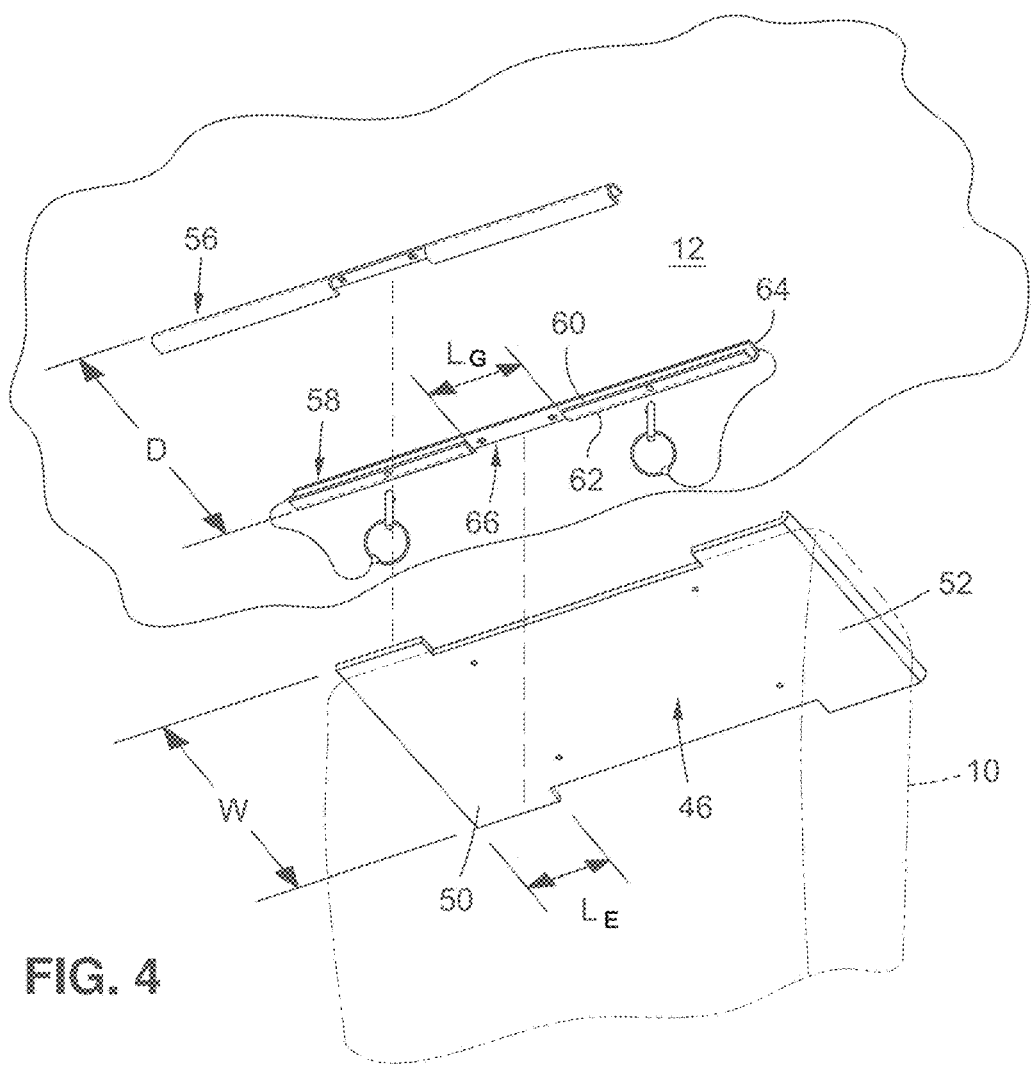
FIG. 4 is a perspective view showing the mounting plate of FIGS. 2 and 3, in exploded relationship to a pair of mounting rails on the ceiling of the firefighting vehicle, and with the gear bag shown in phantom.

FIG. 4 shows a pair of mounting rails 56, 58 mounted on the ceiling 12 of the crew cabin. The rails are separated by a distance D that is slightly greater than the width W of the enlarged ends 50, 52 of the mounting plate. Each rail is essentially C-shaped, with a bottom portion 60, a top portion 62, and a groove 64 defined between the bottom and top portions 60, 62. A gap 66 is formed in the center of the top portion 62 of each rail 56, 58. The length $L_G$ of the gap 66 is slightly greater than the length LE of each of the enlarged ends 46, 48 of the mounting plate 46.

Figure 5:
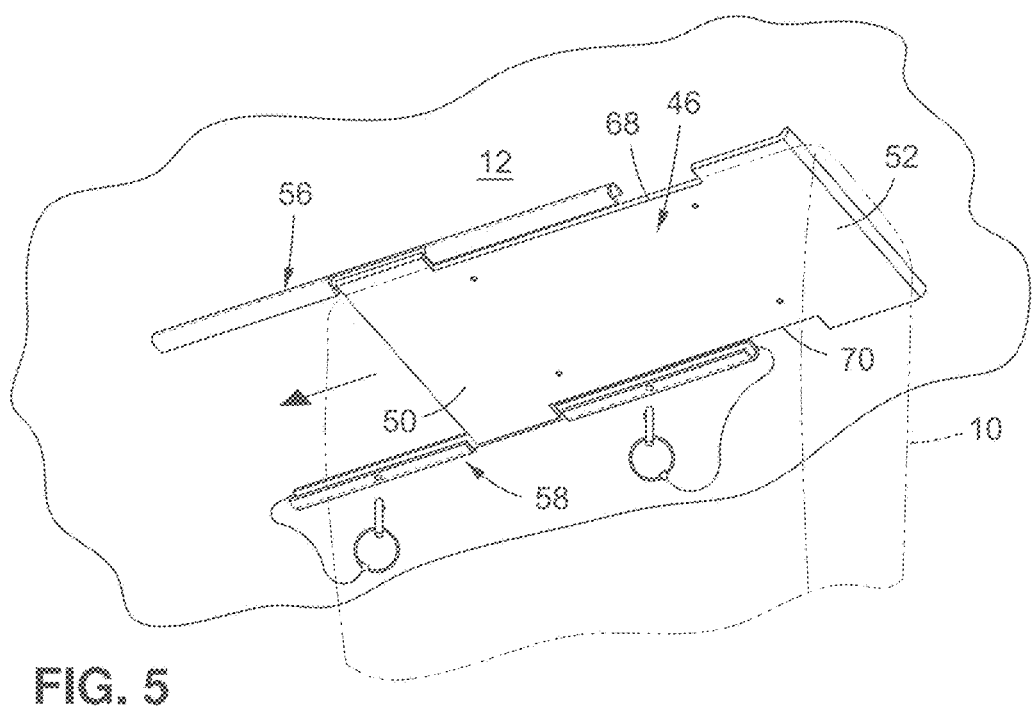
FIG. 5 is a perspective view showing the mounting plate in a partially inserted position between the mounting rails, and with the gear bag shown in phantom.
Figure 6:
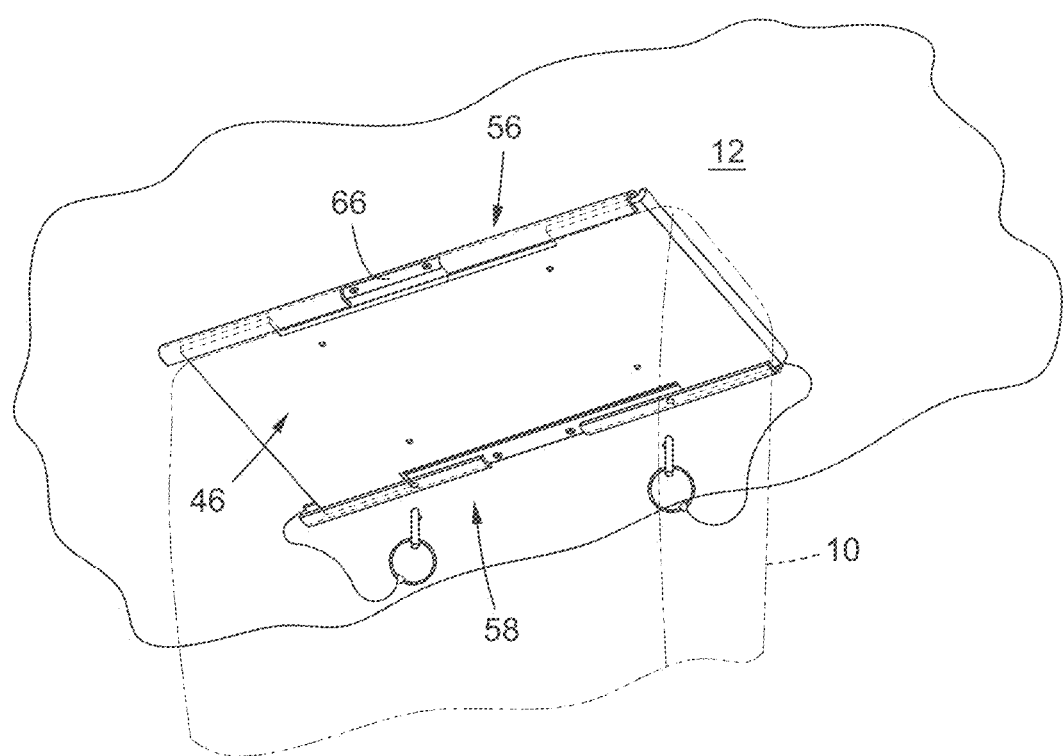
FIG. 6 is a perspective view showing the mounting plate in a fully inserted position between the mounting rails, and with the gear bag shown in phantom

To mount the gear bag 10 on the ceiling 12, a firefighter positions the gear bag 10 bottom-side up so that the one of the enlarged ends 50 of the mounting plate 46 is aligned with the gap 66 in the top portion 62 of each of the rails 56, 58, and the side edges 68, 70 of the connector portion 54 are received within the groove 64, as shown in FIG. 5. The firefighter pushes the opposite enlarged end 52 towards the gap 66, until the entire length of the mounting plate 46 is contained within the rails 56, 58, as shown in FIG. 6.

Figure 7:
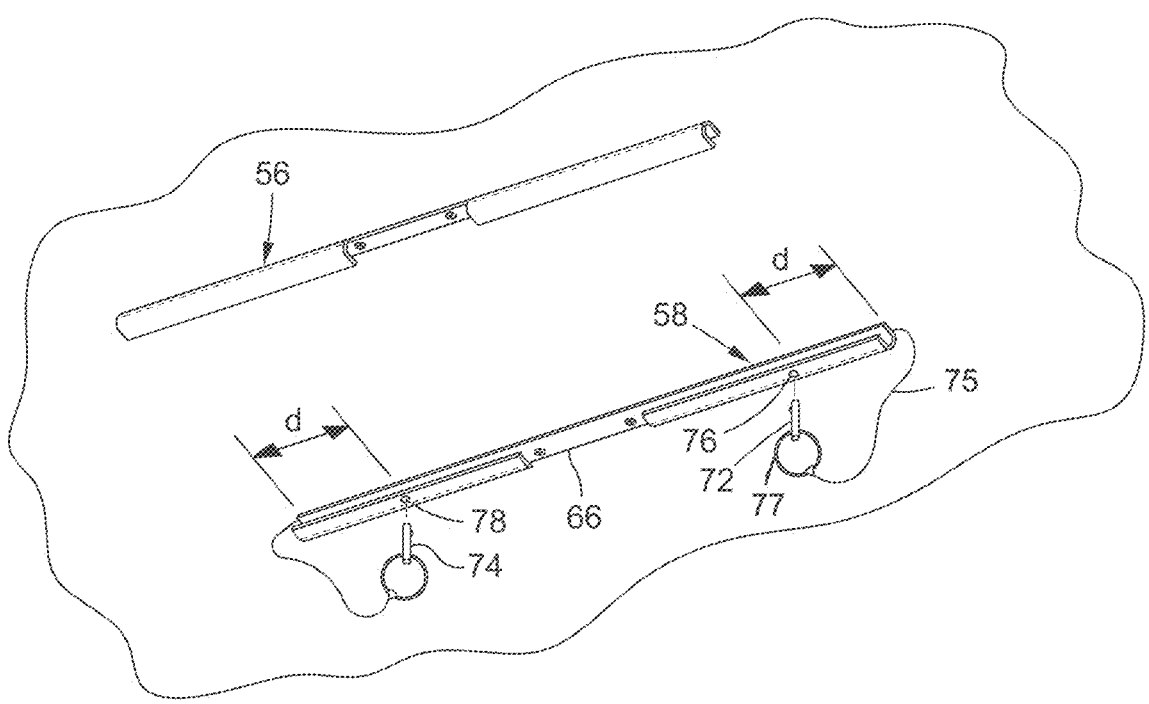
FIG. 7 is a perspective view showing an arrangement for locking the mounting plate between the mounting rails.

A retention assembly for maintaining the mounting plate 46 in a fixed position relative to the rails 56, 58 is shown in FIG. 7. In the illustrated embodiment, the retention assembly comprises a pair of detent pins 72, 74, each attached by a connector cable 75 to an opposite end of one of the mounting rails 58. Each pin is configured to be inserted through a hole 76, 78 in the upper portion of one of the mounting rails 58. The distance d between each hole 76, 78 and the nearest end of the mounting plate 46 is slightly greater than the length $L_E$ of the enlarged ends 50, 52 of the mounting plate 46. Thus, when the pins 72, 74 are inserted, the inner transverse edge 53 of each enlarged end 50, 52 abuts against the corresponding pin, thereby preventing the mounting plate 46 from sliding out of the rails 56, 58. Each pin 72, 74 has an enlarged ring 77 at one end that functions as a manipulation element allowing the pin to be easily grasped.

To remove a gear bag from the ceiling, a firefighter simply removes the detent pins 72, 74 from their respective holes 76, 78, slides the bag along the rails 56, 58 until one of the enlarged ends 50, 52 is aligned with the gap 66. The bag can then be pulled away from the ceiling and carried wherever needed.

Figure 8:
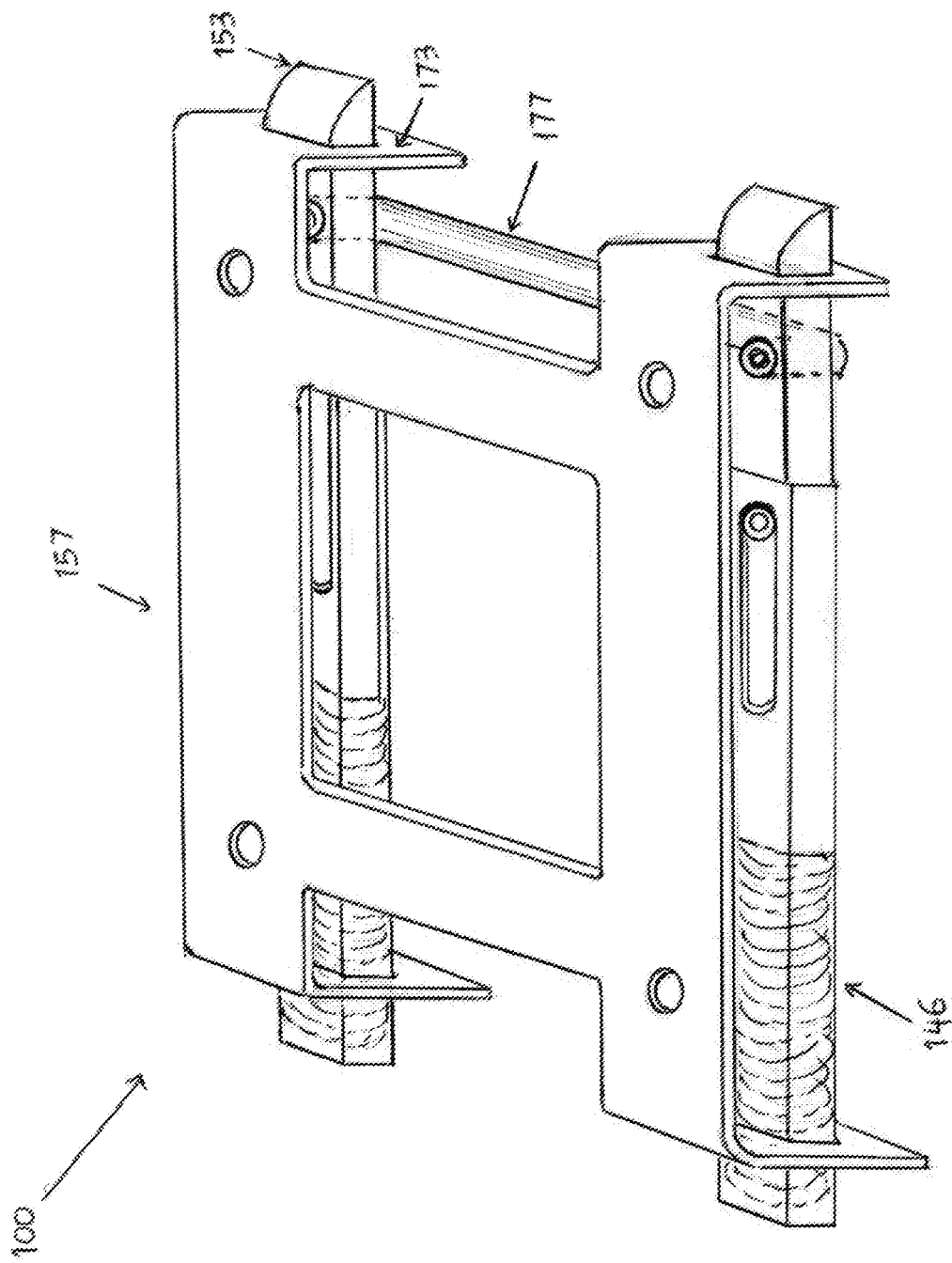
FIG. 8 is a perspective view showing an attachment system.

In another example, a gear bag may be secured to the ceiling or any other surface in the cabin of a firefighting vehicle using the attachment assembly 100 shown in FIG. 8. The attachment assembly 100 includes a rod assembly 146 configured to be secured to the bottom of gear bag or another item, and a mounting bracket 157 configured to be secured to a surface. The mounting assembly 100 includes a first retention element 173 on or in the mounting bracket 157 which cooperates with a second retention element 153 on the rod assembly 146 to prevent accidental separation of the rod assembly 147 from the mounting bracket 157 while the vehicle is moving. A manipulation element 177 coupled to the rod assembly 146 facilitates intentional separation of the rod assembly 147 from the mounting bracket 157 while the vehicle is stationary.

Figure 9:
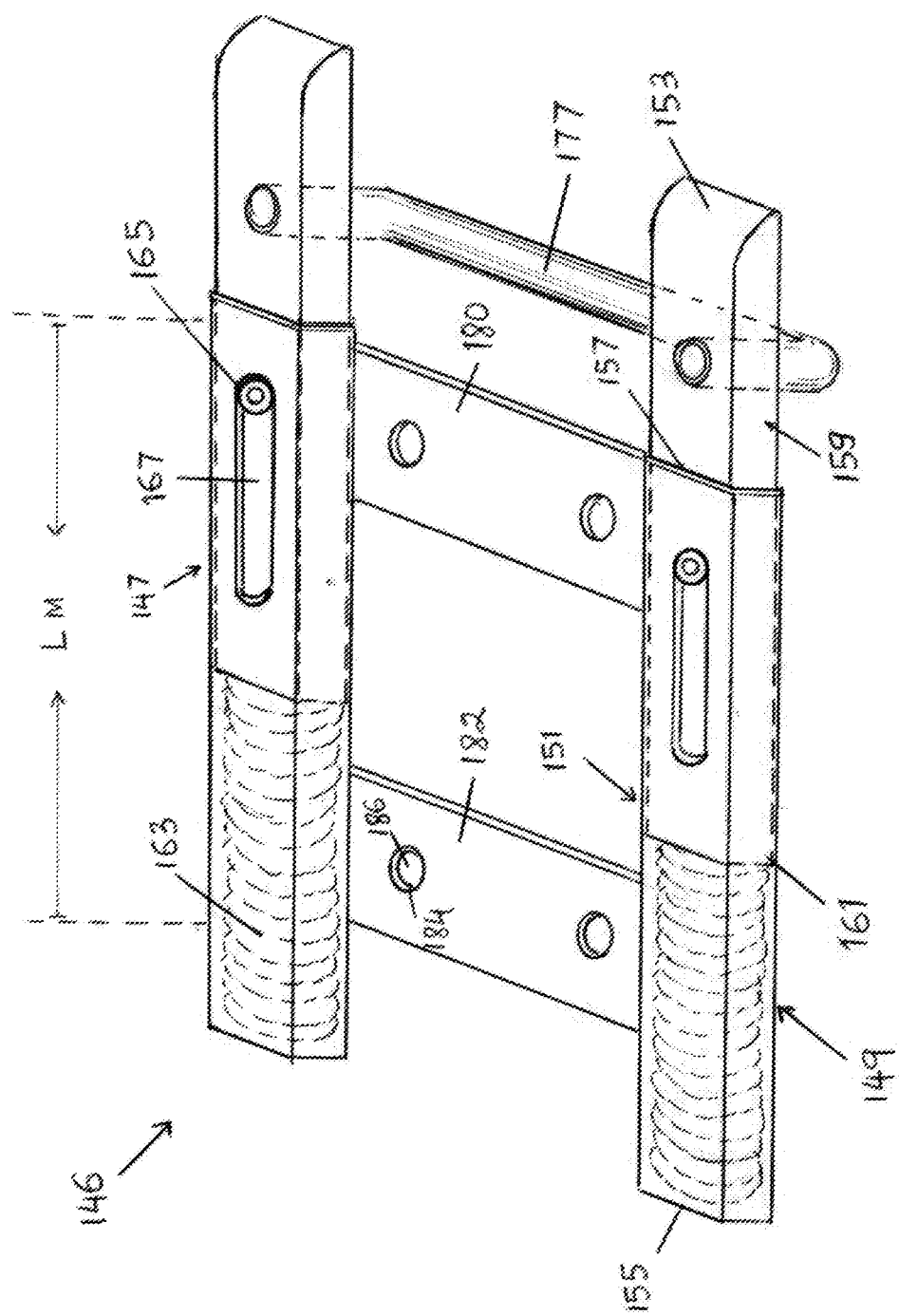
FIG. 9 is a perspective view showing a first mounting component of the attachment system of FIG. 8.

The rod assembly 146, best seen in FIG. 9, includes a pair of compressible rods 147, 149. Each compressible rod includes a tubular stationary segment 151 having a closed end 155 and an open end 157, and a movable segment 159 having a first end that serves as the second retention element 153 and a second end 161 that is mounted for sliding movement in the open end 157 of the stationary segment 151. A compression spring 163 extends between the closed end 153 of the tubular stationary segment 151 and the second end 161 of the movable segment 159. The end of the movable segment that serves as the second retention element 153 may be angled so that it resembles and functions as a latch bolt.

The tubular stationary segment 151 has a length $L_{M'}$ approximately equal to or slightly less than the length of the item being supported. For instance, for the gear bag shown in FIG. 2, $L_{M'}$ will be approximately equal to or slightly less than the length L of the bottom wall of the bag. The stationary and movable segments 151, 159 are coupled to one another by a stop pin 165 that projects outwardly from a side of the movable segment 159 and is slidably received in an elongated slot 167 in a side of the stationary segment 151. The stationary segment 151 of each compressible rod is coupled to the stationary segment 151 of the other compressible rod by a pair of spaced apart cross-plates 180, 182 each of which includes mounting openings 184 for receiving bolts, rivets, or other fasteners 186 for securing the rod assembly 146 to the bottom wall of the gear bag. The movable segment 159 of each compressible rod is coupled to the movable segment of the other compressible rod by a roughly U-shaped bar that serves as a handle or manipulation element 177 that the user can press to force each movable segment 159 toward the closed end 155 of its corresponding stationary segment 151.

Figure 10:
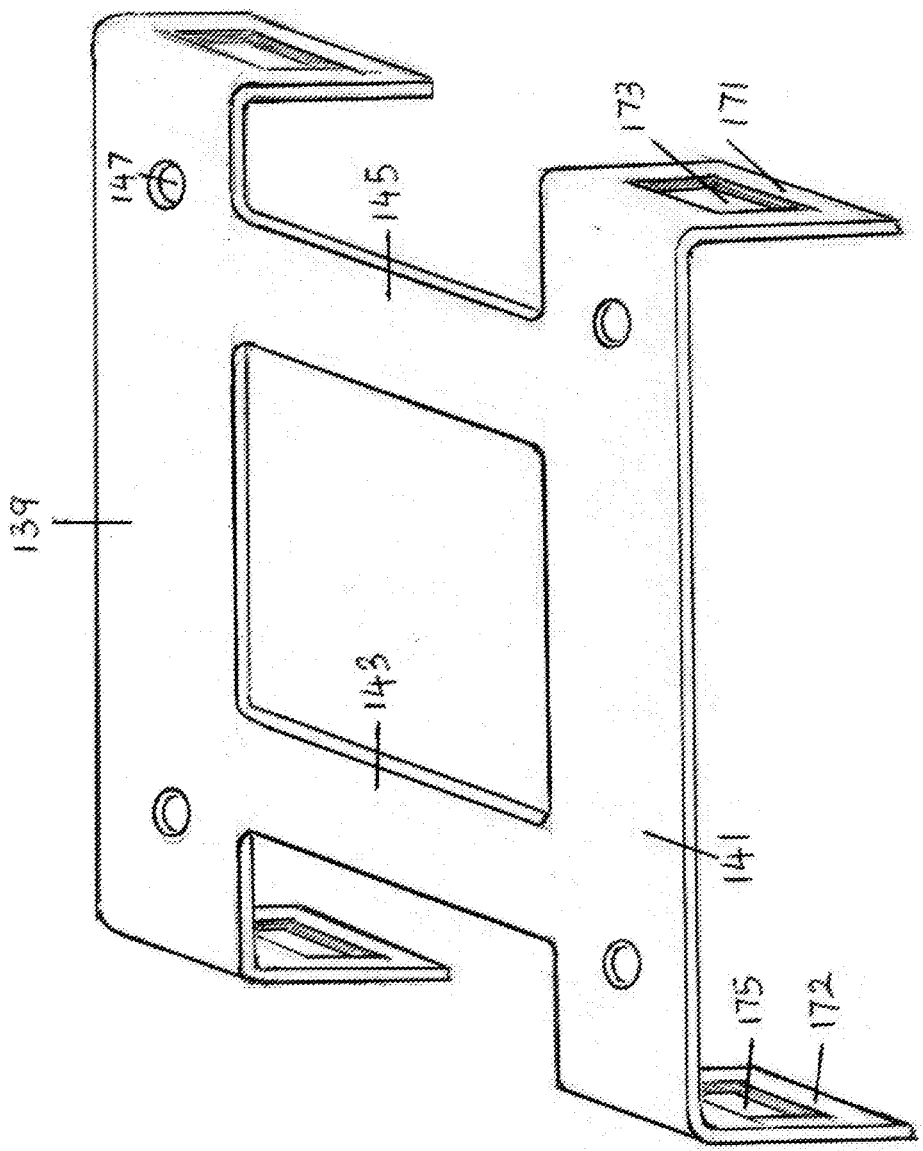
FIG. 10 is a perspective view showing a second mounting component of the attachment system of FIG. 9.

The mounting bracket 157, best seen in FIG. 10, includes a pair of spaced-apart, elongated mounting plates 139, 141 coupled to one another by a pair of transversely extending connector plates 143, 145. Mounting holes 147 are provided in the mounting bracket 157 for receiving fasteners to secure the mounting bracket 157 to the floor, ceiling, or other surface in the cabin of the firefighting vehicle. One end of each mounting plate 139, 141 is bent at an angle of approximately 90° to form a first tab 171, and the opposite end of each of each mounting plate 139, 141 is bent at the same or similar angle to form a second tab 172. The first tab 171 of each mounting plate 139, 141 defines a first opening which functions as the first retention element 173. Each first retention element/first opening 173 may be configured to resemble and function as a strike plate receiving the angled front end of the movable segment of the corresponding compressible rod. The second tab 172 of each mounting plate 139, 141 defines a second opening 175 which is sized and shaped to closely surround the closed end of the stationary segment of the compressible rod.

To attach a gear bag to a surface of firefighting vehicle using the attachment assembly of FIGS. 8-10, a user inserts the closed end 155 of the stationary segment of each rod 147, 149 of the rod assembly into a second opening 175 in a second tab 172, pressing the movable segments 159 inwardly to compress each spring 163 until each 147, 149 rod is short enough to fit between the first and second tabs 171, 172. The user then releases the movable segments 159, allowing each spring 163 to expand and push the first end 153 of each movable segment 159 into engagement with the first opening 173.

To detach the gear bag from the surface of the firefighting vehicle, the user presses on the manipulation handle 177, forcing the movable segments 159 to move toward the closed ends 155 of the rods 147, and causing the first end 153 of each movable segment 159 to disengage with the corresponding first opening 173. Once each first end 153 of is clear of the corresponding first opening 173, the user can easily pull the closed ends 155 of the rods 147 out of the second openings 175 in the second tabs 172 to detach the rod assembly from the mounting bracket 146.

The attachment assemblies described above and in the following claims may be adapted for storing items other than gear bags in the cab of an emergency vehicle. For instance, the attachment assemblies disclosed herein may be used to secure an item such as a radio or an air tank to a ceiling, floor, wall, or any other available surface in a fire truck or other emergency vehicle, thus preventing the item from becoming a projectile that could injure occupants of the vehicle when the vehicle is traveling at high speeds or is involved in an accident. The number of rods in the rod assembly of FIGS. 8-10 may be changed in accordance with the type of item being secured; i.e., a rod assembly for narrow items may consist of a single rod, while larger items may require three or more rods. Similarly, the structure of the mounting bracket could be modified depending on the location in which it intended to be used. If the item is to be attached near a corner between two walls, for instance, it may be possible to eliminate the second tab and to insert the closed end of the stationary portion of the compressible rod into a hole in one of the walls, while the free end of the movable portion projects into an opening in a simpler bracket extending from the other wall.

The attachment assemblies described herein may also be used to secure items surfaces on the exterior of vehicles, in or on buildings, or in a variety of other locations.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An attachment system for securing an item to a surface, the system comprising:
    a first mounting component fixed to the surface, the first mounting component including a mounting bracket secured to the surface, the mounting bracket defining an opening;
    a second mounting component fixed to the item and cooperating with the first component to detachably secure the item to the surface, the second mounting component including
        a compressible rod coupled to a portion of the item, the rod having
            a stationary segment,
            a movable segment sized and shaped to engage the opening in the mounting bracket, and
            a spring disposed between the stationary segment and the movable segment, and configured to urge the movable segment away from the stationary segment;
    a first retention element associated with the first mounting component; and
    a second retention element associated with the second mounting component and cooperating with the second element to prevent accidental separation of the first and second mounting components.

2. The attachment system according to claim 1, further comprising a manipulation element coupled to one of the first and second retention elements and configured to facilitate intentional separation of the second mounting component from the first mounting element.

3. The attachment system according to claim 2, wherein the manipulation element comprises a handle extending from the movable segment of the rod and configured to enable a user to push the movable segment toward the stationary segment and out of engagement with the opening in the mounting bracket.

4. The attachment system according to claim 1, wherein:
    the stationary segment comprises a tube having a closed end and an open end;
    the movable segment includes a first end configured to engage the opening in the mounting bracket and a second end mounted for sliding movement in the open end of the tube; and
    the spring extends between the closed end of the tube and the second end of the movable segment.

5. The attachment system according to claim 4; wherein: the tube includes a side wall defining an elongated slot; and the movable segment includes a pin projecting through the elongated slot.

6. The attachment system according to claim 4, wherein the first end of the movable segment has an angled front end and functions as a latch bolt.

7. The attachment system according to claim 4, wherein the mounting bracket comprises:
    a planar mounting plate configured to be detachably secured to the surface, the mounting plate including a first end and a second end;
    a first tab extending at an angle to the first end of the mounting plate and defining the opening; and
    a second tab extending at an angle to the second end of the mounting plate and defining a second opening sized and shaped to closely surround the closed end of the tube.

8. The attachment system according to claim 1, wherein:
    the rod is part of a rod assembly comprising a first rod mounted on one side of the item and a second rod mounted on an opposite side of the item, each rod including
        a stationary segment,
        a movable segment, and
        a spring disposed between the stationary segment and the movable segment; and
    the mounting bracket defines
        a first opening sized and shaped to engage the movable segment of the first rod, and
        a second opening sized and shaped to engage the movable segment of the second rod.

9. The attachment system according to claim 8 further comprising a bar extending between the movable segment of the first rod and the movable segment of the second rod, the bar functioning as a handle enabling a user to push each movable segment toward the corresponding stationary segment and out of engagement with the corresponding opening in the mounting bracket.

10. The attachment system according to claim 8,
    each stationary segment comprises a tube having a closed end and an open end;
    each movable segment includes a first end configured to engage the corresponding opening in the mounting bracket and a second end mounted for sliding movement in the open end of the corresponding tube; and
    the spring extends between the closed end of the corresponding tube and the second end of the corresponding movable segment.

11. The attachment system according to claim 10, wherein the mounting bracket comprises:
    a first planar mounting portion and a second mounting portion, each mounting portion including a first end and a second end;
    a first tab extending at an angle to the first end of each mounting portion and defining a first opening; and
    a second tab extending at an angle to the second end of each mounting portion and defining a second opening sized and shaped to closely surround the closed end of the corresponding tube.

12. The attachment system according to claim 1, wherein the item has a predetermined length and the rod when fully extended is longer than the length of the item.

13. The attachment system according to claim 1, wherein:
    the item has an edge;
    the open end of the stationary segment has an edge aligned with the edge of the item; and
    the movable segment extends beyond the edge of the item.

14. The attachment system according to claim 1, wherein the surface is part of an automotive vehicle.

15. The attachment system of claim 14, wherein the item is an equipment bag.

16. A storage assembly comprising:
an equipment bag having a bottom; and
an attachment system for securing the equipment bag to a surface, the attachment system including
a first mounting component fixed to the surface, the first mounting component including a mounting bracket secured to the surface, the mounting bracket defining an opening;
a second mounting component fixed to the bag and cooperating with the first component to detachably secure the item to the surface, the second mounting component including;
a compressible rod coupled to the bottom of the bag, the rod having
a stationary segment,
a movable segment sized and shaped to engage the opening in the mounting bracket, and
a spring disposed between the stationary segment and the movable segment, and configured to urge the movable segment away from the stationary segment;
a first retention element associated with the first mounting component; and
a second retention element associated with the second mounting component and cooperating with the second element to prevent accidental separation of the first and second mounting components.

17. The storage assembly according to claim 16, wherein the surface comprises a surface in the cab of an emergency vehicle.

18. A storage assembly comprising:
an item; and
an attachment system including
a first mounting component fixed to a surface in the cab of an emergency vehicle the first mounting component including a mounting bracket secured to the surface, the mounting bracket defining an opening;
a second mounting component fixed to the item and cooperating with the first component to detachably secure the item to the surface, the second mounting component including;
a compressible rod coupled to the item, the rod having
a stationary segment,
a movable segment sized and shaped to engage the opening in the mounting bracket, and
a spring disposed between the stationary segment and the movable segment, and configured to urge the movable segment away from the stationary segment;
a first retention element associated with the first mounting component; and
a second retention element associated with the second mounting component and cooperating with the second element to prevent accidental separation of the first and second mounting components.

* * * * *